(12) United States Patent
Mori et al.

(10) Patent No.: US 8,546,994 B2
(45) Date of Patent: Oct. 1, 2013

(54) DYNAMOELECTRIC MACHINE

(75) Inventors: Takeshi Mori, Tokyo (JP); Masaya Inoue, Tokyo (JP); Masao Morita, Tokyo (JP); Hirokazu Akai, Tokyo (JP); Toshiyuki Yoshizawa, Tokyo (JP); Moriyuki Hazeyama, Tokyo (JP); Shinji Nishimura, Tokyo (JP); Kazunori Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 258 days.

(21) Appl. No.: 13/058,875

(22) PCT Filed: Oct. 1, 2008

(86) PCT No.: PCT/JP2008/067812
§ 371 (c)(1),
(2), (4) Date: Feb. 14, 2011

(87) PCT Pub. No.: WO2010/038286
PCT Pub. Date: Apr. 8, 2010

(65) Prior Publication Data
US 2011/0148232 A1     Jun. 23, 2011

(51) Int. Cl.
*H02K 1/22* (2006.01)
*H02K 1/27* (2006.01)
*H02K 5/24* (2006.01)
*H02K 21/04* (2006.01)

(52) U.S. Cl.
CPC ................................. *H02K 21/044* (2013.01)
USPC .......... 310/263; 310/51; 310/71; 310/156.66; 310/156.73

(58) Field of Classification Search
CPC ............. H02K 1/22; H02K 1/27; H02K 5/24; H02K 21/044
USPC .................... 310/51, 71, 156.66, 156.73, 263
See application file for complete search history.

(56) References Cited

U.S. PATENT DOCUMENTS

| 3,271,604 A | * | 9/1966 | Priddy | 310/234 |
| 5,325,003 A | * | 6/1994 | Saval et al. | 310/43 |
| 5,483,116 A | * | 1/1996 | Kusase et al. | 310/263 |

(Continued)

FOREIGN PATENT DOCUMENTS

| JP | 8 308190 | 11/1996 |
| WO | 2008 044347 | 4/2008 |

OTHER PUBLICATIONS

U.S. Appl. No. 13/122,611, filed Apr. 5, 2011, Yoshizawa, et al.

(Continued)

*Primary Examiner* — John K Kim
(74) *Attorney, Agent, or Firm* — Oblon, Spivak, McClelland, Maier & Neustadt, L.L.P.

(57) ABSTRACT

An automotive dynamoelectric machine that achieves disposing of permanent magnets and thickening of field coil wire by ensuring outlet space for field coil lead wires. In the dynamoelectric machine, trough portions are formed on portions of yoke portions between respective circumferentially adjacent claw-shaped magnetic pole portions. Magnet holders are disposed so as to span over all of the trough portions on a pole core body at a rear end excluding a predetermined trough portion, and permanent magnets are held in each of the magnet holders. A field coil lead wire is led out from the rotor so as to pass through the trough portion over which a magnet holder is not disposed.

4 Claims, 8 Drawing Sheets

(56) References Cited

U.S. PATENT DOCUMENTS

| | | | |
|---|---|---|---|
| 5,543,676 A * | 8/1996 | York et al. | 310/263 |
| 5,886,451 A * | 3/1999 | Hatsios et al. | 310/263 |
| 5,925,964 A * | 7/1999 | Kusase et al. | 310/263 |
| 6,172,434 B1 * | 1/2001 | Oohashi et al. | 310/263 |
| 7,560,851 B2 * | 7/2009 | Inoue et al. | 310/263 |
| 7,605,511 B2 * | 10/2009 | Oowatari et al. | 310/156.72 |
| 7,843,107 B2 | 11/2010 | Inoue et al. | |
| 8,304,950 B2 * | 11/2012 | Yoshizawa et al. | 310/263 |
| 8,334,633 B2 * | 12/2012 | Hazeyama et al. | 310/263 |
| 2002/0005673 A1 * | 1/2002 | Umeda et al. | 310/156.11 |
| 2004/0017128 A1 * | 1/2004 | York et al. | 310/263 |
| 2006/0113861 A1 * | 6/2006 | Mukai et al. | 310/263 |
| 2007/0114879 A1 * | 5/2007 | Maeda et al. | 310/263 |
| 2011/0001374 A1 | 1/2011 | Inoue et al. | |
| 2011/0001383 A1 * | 1/2011 | Shimomura et al. | 310/181 |
| 2011/0043068 A1 | 2/2011 | Yoshizawa et al. | |
| 2011/0148232 A1 * | 6/2011 | Mori et al. | 310/71 |

OTHER PUBLICATIONS

International Search Report issued Dec. 22, 2008 in PCT/JP08/67812 filed Oct. 1, 2008.

\* cited by examiner

DYNAMOELECTRIC MACHINE

TECHNICAL FIELD

The present invention relates to a dynamoelectric machine such as an automotive alternator, etc., and particularly relates to a lead construction of field coil lead wires of a Lundell rotor that has permanent magnets.

BACKGROUND ART

Automotive alternators that use Lundell rotors have been used in automobiles for decades. Loads from electrical equipment that is mounted due to environmental issues have been increasing rapidly in recent years, and further increases in generated power are being sought from Lundell rotors.

In order to solve such problems, automotive alternators have conventionally been proposed in which fans are disposed on two axial ends of a Lundell rotor, and permanent magnets are disposed outside a yoke portion between circumferentially adjacent claw-shaped magnetic pole portions so as to be held by the fans (see Patent Literature 1, for example).
Patent Literature 1: Patent Publication No. 2002-527015 (Gazette)

DISCLOSURE OF THE INVENTION

Problem to be Solved by the Invention

In a Lundell rotor, field coil lead wires must be led out from the rotor and connected to power supply slip rings, but no mention is made of field coil lead wires in Patent Literature 1.

The field coil lead wires are conventionally led out from an internal portion of the rotor to an external portion of the rotor along an outer circumferential surface of the yoke portion between circumferentially adjacent claw-shaped magnetic pole portions, and connected to the slip rings. However, in conventional automotive alternators such as that described in Patent Literature 1, it is difficult to ensure outlet space for the field coil lead wires since the permanent magnets are disposed outside the yoke portion between the circumferentially adjacent claw-shaped magnetic pole portions.

In addition to disposing permanent magnets, further increases in output are possible by applying field magnetomotive force to the rotor poles. Here, in order to increase the field magnetomotive force, it is necessary to reduce the number of turns in the field coil, thicken the wire of the field coil, and increase the field current that is passed to the field coil. In particular, since the voltage of an automotive power source is approximately 12 V, which is low, thick wire that has a diameter in the order of 1 mm has been used for the wire of the field coil. At the same time, thick wire that has a diameter in the order of 1 mm has also been used for the field coil lead wires.

In conventional automotive alternators such as that described in Patent Literature 1, thickening of the field coil lead wires makes securing outlet space for the leader wires even more difficult. Thus, it is conceivable that the field coil lead wires could be lead out externally from the rotor so as to avoid the claw-shaped magnetic pole portions that face the permanent magnets and pass through outside the permanent magnets.

However, in automotive alternators in which the rotor rotates at high speeds up to approximately 20,000 rpm, lead wire supporting construction becomes cumbersome because centrifugal forces that act on the leader wire increase with thickening of the leader wire. If the lead wires are passed through outside the permanent magnets, the lead wire supporting construction becomes even more cumbersome because the position of the lead wires is shifted radially outward, further increasing the centrifugal forces that act on the lead wires.

Thus, in conventional automotive alternators, although increased output can be achieved by increasing the field magnetomotive force by thickening the wire of the field coil in addition to disposing the permanent magnets, conflicting problems remain that prevent field magnetomotive force being increased such as outlet space for the lead wires being eliminated, and thickening of the wires of the field coil being made difficult by disposing the permanent magnets.

The present invention aims to solve the above problems and an object of the present invention is to provide an automotive dynamoelectric machine that achieves disposing of permanent magnets and thickening of field coil wire by ensuring outlet space for field coil lead wires.

Means for Solving the Problem

In order to achieve the above object, according to one aspect of the present invention, there is provided a dynamoelectric machine including: a rotor including: a pole core including: a boss portion; a pair of yoke portions that are disposed so as to extend radially outward from two axial end edge portions of the boss portion; and a plurality of claw-shaped magnetic pole portions that are disposed so as to extend in an axial direction alternately from each of the pair of yoke portions, and that are arranged circumferentially so as to intermesh with each other, the pole core being fixed to a rotating shaft that is inserted through a central axial position of the boss portion; and a field coil that is housed inside a space that is surrounded by the boss portion, the pair of yoke portions, and the plurality of claw-shaped magnetic pole portions; and a stator that is disposed so as to surround an outer circumference of the rotor such that a predetermined air gap is interposed. The present dynamoelectric machine also includes: magnet holders that are disposed in claw crotch portions that are formed on portions of the yoke portions between circumferentially adjacent claw-shaped magnetic pole portions excluding at least one of the claw crotch portions; and permanent magnets that are disposed so as to be held by the magnet holders so as to face inner circumferential surfaces near tip ends of the claw-shaped magnetic pole portions so as to have a predetermined clearance. A lead wire of the field coil is led out through the claw crotch portion in which the magnet holders are not disposed.

Effects of the Invention

According to the present invention, a magnet holder is not disposed in a claw crotch portion through which field coil lead wires are led out. Thus, because a large outlet space can be ensured, disposal of permanent magnet and thickening of field coil lead wires, in other words, thickening of field coil wire can be achieved, enabling increased dynamoelectric machine output.

BEST MODE FOR CARRYING OUT THE INVENTION

Embodiment 1

Figure 1:
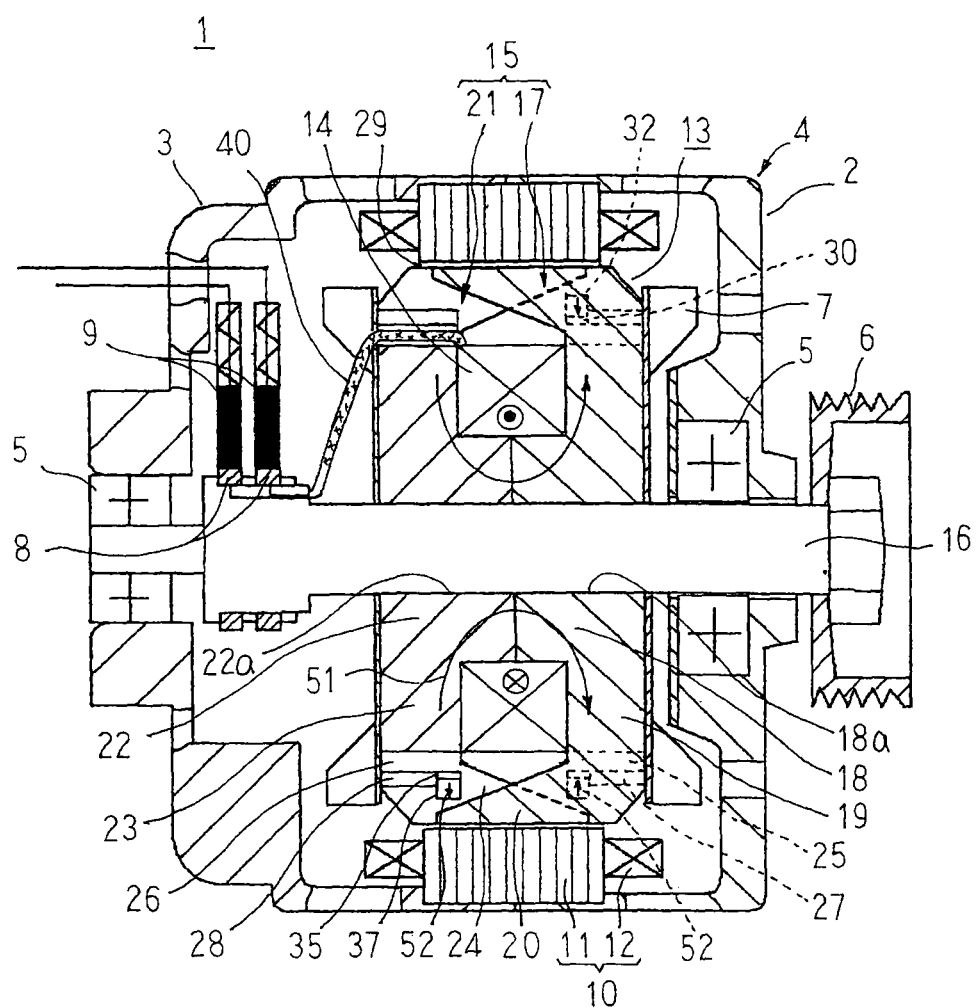
FIG. 1 is a cross section that schematically shows an automotive alternator according to Embodiment 1 of the present invention.
Figure 2:
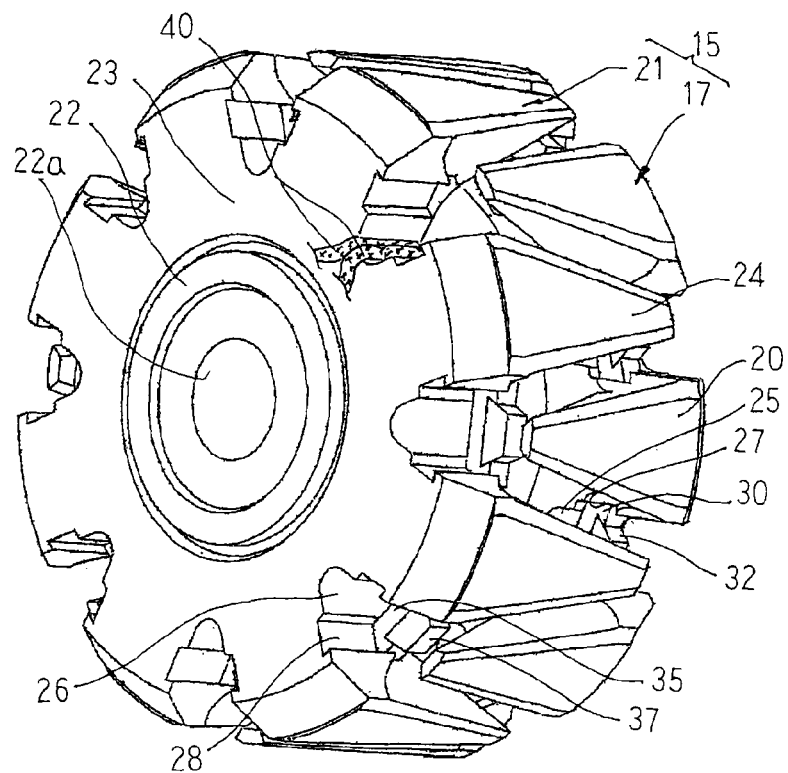
FIG. 2 is a perspective that shows a rotor that can be used in the automotive alternator according to Embodiment 1 of the present invention.
Figure 3:
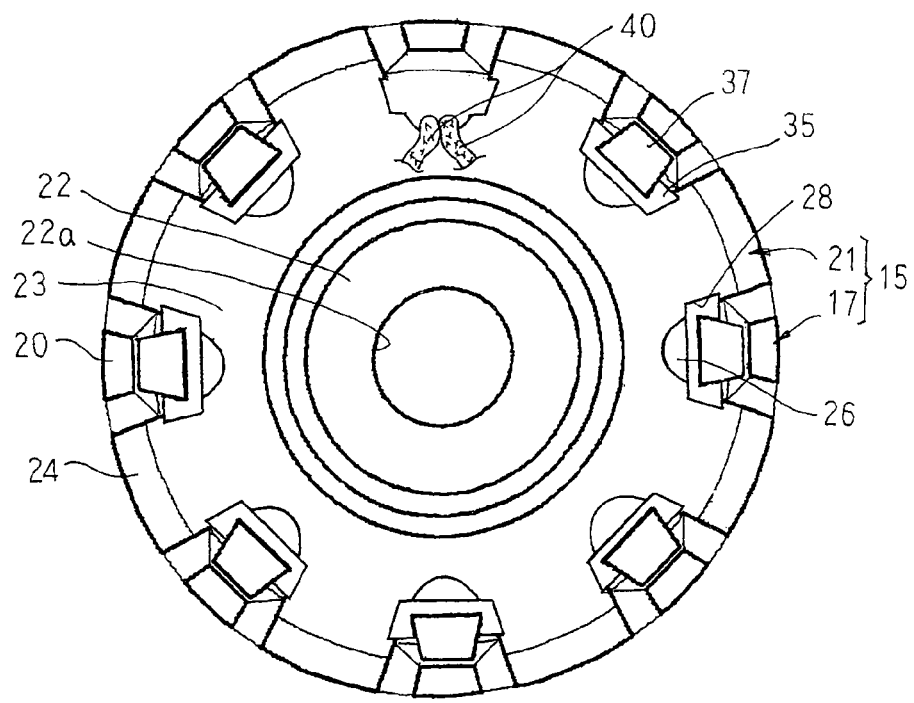
FIG. 3 is an end elevation of the rotor that can be used in the automotive alternator according to Embodiment 1 of the present invention that is viewed from a rear end.
Figure 4:
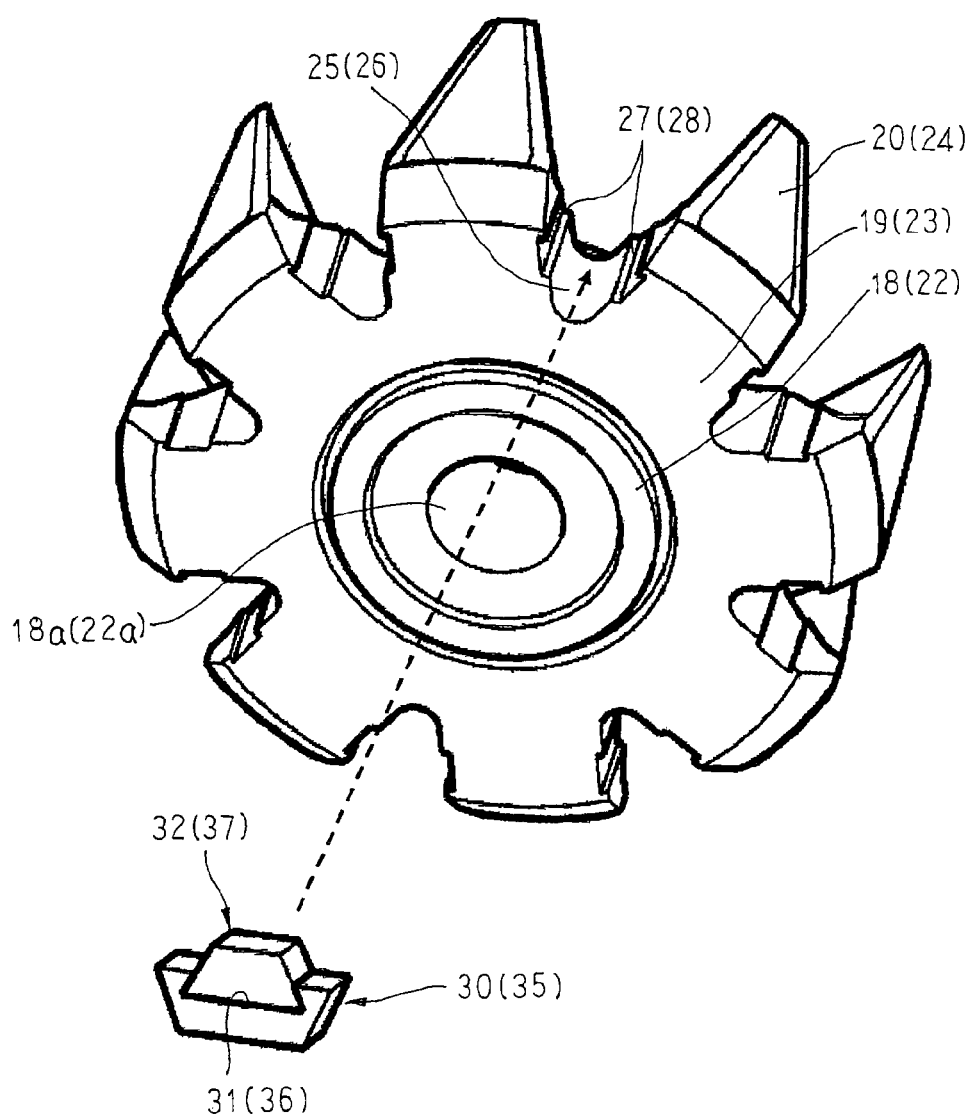
FIG. 4 is a perspective that explains a method for mounting a permanent magnet to a pole core body that constitutes the rotor that can be used in the automotive alternator according to Embodiment 1 of the present invention that is viewed from a rear end.

FIG. 1 is a cross section that schematically shows an automotive alternator according to Embodiment 1 of the present invention, FIG. 2 is a perspective that shows a rotor that can be used in the automotive alternator according to Embodiment 1 of the present invention, FIG. 3 is an end elevation of the rotor that can be used in the automotive alternator according to Embodiment 1 of the present invention that is viewed from a rear end, and FIG. 4 is a perspective that explains a method for mounting a permanent magnet to a pole core body that constitutes the rotor that can be used in the automotive alternator according to Embodiment 1 of the present invention that is viewed from a rear end.

In FIGS. 1 through 4, an automotive alternator 1 includes: a case 4 that is constituted by a front bracket 2 and a rear bracket 3 that are each made of aluminum in an approximate cup shape; a rotor 13 that is rotatably disposed inside the case 4 such that a rotating shaft 16 is supported by means of bearings 5 in the case 4; a pulley 6 that is fixed to an end portion of the rotating shaft 16 that projects outward at a front end of the case 4; fans 7 that are fixed to two end surfaces of the rotor 13 in an axial direction of the rotating shaft 16; a stator 10 that is fixed to the case 4 so as to surround an outer circumference of the rotor 13 so as to have a constant air gap 29 relative to the rotor 13; a pair of slip rings 8 that are fixed to a rear end of the rotating shaft 16, and that supply current to the rotor 13; and a pair of brushes 9 that are disposed inside the case 4 so as to slide on the respective slip rings 8. Moreover, although not shown, a rectifier that rectifies an alternating current that is generated in the stator 10 into direct current, and a voltage regulator that adjusts magnitude of an alternating voltage generated in the stator 10, etc., are disposed inside the case 4. Hereinafter, a direction that is parallel to the axial direction of the rotating shaft 16 shall be called "the axial direction".

The stator 10 includes: a cylindrical stator core 11; and a stator coil 12 that is mounted to the stator core 11, and in which an alternating current arises due to changes in magnetic flux from a field coil 14 (described below) that accompany rotation of the rotor 13.

The rotor 13 includes: a field coil 14 that generates magnetic flux on passage of an excitation current; a pole core 15 that is disposed so as to cover the field coil 14 and in which magnetic poles are formed by that magnetic flux; and the rotating shaft 16, which is fitted through a central axial position of the pole core 15.

The pole core 15 is configured so as to be divided into first and second pole core bodies 17 and 21 that are each prepared by a cold forging method using a low carbon steel such as S10C, for example.

The first pole core body 17 has: a first boss portion 18 that has an outer circumferential surface that has a cylindrical shape, and in which a rotating shaft insertion aperture 18a is formed so as to pass through a central axial position; a thick ring-shaped first yoke portion 19 that is disposed so as to extend radially outward from a first end edge portion of the first boss portion 18; and first claw-shaped magnetic pole portions 20 that are disposed so as to extend toward a second axial end from outer circumferential portions of the first yoke portion 19. Eight, for example, first claw-shaped magnetic pole portions 20 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially.

First trough portions 25 that function as claw crotch portions are recessed so as to have U shapes that curve concavely toward a radially-inner side at portions that are positioned between respective adjacent first claw-shaped magnetic pole portions 20 of the first yoke portion 19. First holding grooves 27 are recessed so as to pass through from a first end portion to a second end portion of the first yoke portion 19 near root ends of respective first claw-shaped magnetic pole portions 20 of the first pole core body 17 so as to have openings at respective facing portions near upper portions of inner walls surfaces of the respective first trough portions 25 and so as to have groove directions in the axial direction. Here, the first holding grooves 27 are formed so as to have groove shapes that have box-shaped cross sections that conform to shapes of interfitting portions on two width direction ends of first magnet holders 30 that are described below. Specifically, the first holding grooves 27 have groove shapes that have box-shaped cross sections that are constituted by pairs of parallel, flat side surfaces into which upper and lower surfaces of the first magnet holders 30 engage, and flat bottom surfaces into which side surfaces of the first magnet holders 30 engage.

The second pole core body 21 has: a second boss portion 22 that has an outer circumferential surface that has a cylindrical shape, and in which a rotating shaft insertion aperture 22a is formed so as to pass through a central axial position; a thick ring-shaped second yoke portion 23 that is disposed so as to extend radially outward from a second end edge portion of the second boss portion 22; and second claw-shaped magnetic pole portions 24 that are disposed so as to extend toward a first axial end from outer circumferential portions of the second yoke portion 23. Eight, for example, second claw-shaped magnetic pole portions 24 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform angular pitch circumferentially.

Second trough portions 26 that function as claw crotch portions are recessed into U shapes that curve concavely toward a radially-inner side at portions that are positioned between respective adjacent second claw-shaped magnetic pole portions 24 of the second yoke portion 23. Second holding grooves 28 are recessed so as to pass through from a first end portion to a second end portion of the second yoke portion 23 near root ends of respective second claw-shaped magnetic pole portions 24 of the second pole core body 21 so as to have openings at respective facing portions near upper portions of inner walls surfaces of the respective second trough portions 26 and so as to have groove directions in the axial direction. Here, the second holding grooves 28 are formed so as to have groove shapes that have box-shaped cross sections that conform to shapes of interfitting portions on two width direction ends of second magnet holders 35 that are described below. Specifically, the second holding grooves 28 have groove shapes that have box-shaped cross sections that are constituted by pairs of parallel, flat side surfaces into which upper and lower surfaces of the second magnet holders 35 engage, and flat bottom surfaces into which side surfaces of the second magnet holders 35 engage.

A first magnet holder 30 is prepared by a cold forging method, drawing, cutting, etc., using a magnetic material such as iron, a ferromagnetic alloy, etc., into a columnar body that is thinner than an axial thickness of the first yoke portion 19. The first magnet holder 30 is prepared into a columnar body that has a trapezoidal cross section perpendicular to a thickness direction in which upper and lower surfaces are mutually parallel flat surfaces, two side surfaces are inclined surfaces that have spacings that become gradually wider toward the upper surface, and two end surfaces are flat surfaces that are perpendicular to the thickness direction. A first interfitting groove 31 that has a groove direction in the thickness direction of the first magnet holder 30 is recessed so as to have an opening at the upper surface of the first magnet holder 30. This first interfitting groove 31 is formed into a wedge shape in which a bottom surface thereof is a flat surface that is parallel to the upper and lower surfaces of the first magnet holder 30, and a groove width thereof becomes gradually narrower toward the opening.

A first permanent magnet 32 is prepared into a columnar body that has a trapezoidal cross section perpendicular to a thickness direction in which upper and lower surfaces are mutually parallel flat surfaces, two side surfaces are inclined surfaces that have spacings that becomes gradually wider toward the upper surface, and two end surfaces are flat surfaces that are perpendicular to the thickness direction. The first permanent magnet 32 has a thickness that is similar to that of the first magnet holder 30, and a lower end portion thereof is formed into an external shape that is similar to that of the groove shape of the first interfitting groove 31.

A second magnet holder 35 is prepared into an identical shape as the first magnet holder 30 using an identical material. A second interfitting groove 36 that has a similar shape to that of the first interfitting groove 31 is recessed so as to have an opening at an upper surface of the second magnet holder 35. A second permanent magnet 37 is prepared into an identical shape as the first permanent magnet 32 using an identical material.

To assemble a rotor 13 that is configured in this manner, lower end portions of the first permanent magnets 32 are first fitted into the first interfitting groove 31 from a thickness direction of the first magnet holders 30, and are held so as to be connected magnetically to the first magnet holders 30, an adhesive being applied if required. Lower end portions of the second permanent magnets 37 are similarly fitted into the second interfitting groove 36 from a thickness direction of the second magnet holders 35, and are held so as to be connected magnetically to the second magnet holders 35, an adhesive being applied if required.

Next, as shown in FIG. 4, the first magnet holders 30 are disposed on respective first trough portions 25 by being press-fitted into the facing first holding grooves 27 from axially outside such that the upper surfaces of the first permanent magnets 32 face radially outward, adhesive being applied if required. The first magnet holders 30 are thereby mounted to the first pole core body 17 so as to be magnetically connected when disposed so as to span the respective first trough portions 25. Moreover, the first magnet holders 30 into which the first permanent magnets 32 have been mounted are disposed so as to span over all of the first trough portions 25.

Similarly, the second magnet holders 35 are disposed on respective second trough portions 26 by being press-fitted into the facing second holding grooves 28 from axially outside such that the upper surfaces of the second permanent magnets 37 face radially upward, adhesive being applied if required. The second magnet holders 35 are thereby mounted to the second pole core body 21 so as to be magnetically connected when disposed so as to span the respective second trough portions 26. Moreover, the second magnet holders 35 into which the second permanent magnets 37 have been mounted are disposed so as to span over seven second trough portions 26, and are not disposed so as to span over one remaining second trough portion 26.

Next, first and second pole core bodies 17 and 21 that are configured in this manner are fixed integrally by fitting the rotating shaft 16 into the rotating shaft insertion apertures 18*a* and 22*a* such that the first and second claw-shaped magnetic pole portions 20 and 24 alternately intermesh and a second end surface of the first boss portion 18 is abutted to a first end surface of the second boss portion 22. At this time, the field coil 14, which has been wound onto a bobbin (not shown), is mounted in a space that is surrounded by the first and second boss portions 18 and 22, the first and second yoke portions 19 and 23, and the first and second claw-shaped magnetic pole portions 20 and 24. Then, two lead wires 40 of the field coil 14 are led out through the second trough portion 26 in which a second magnet holder 35 has not been disposed, and are connected to each of the pair of slip rings 8.

Moreover, the first and second boss portions 18 and 22 and the first and second yoke portions 19 and 23 correspond to a boss portion and first and second yoke portions of the pole core 15.

In a rotor 13 that has been assembled in this manner, the first and second magnet holders 30 and 35 are disposed so as to span over the first and second trough portions 25 and 26. Tip end portions of the first and second claw-shaped magnetic pole portions 20 and 24 overlap with the second and first yoke portions 23 and 19, respectively, in the axial direction. Here, the upper surfaces of the first and second permanent magnets 32 and 37 respectively face inner circumferential surfaces near the tip ends of the second and first claw-shaped magnetic pole portions 24 and 20 so as to leave a predetermined clearance.

The first and second magnet holders 30 and 35 are fitted into the first and second holding grooves 27 and 28, and are held by the first and second pole core bodies 17 and 21 such that radial, circumferential, and axial movement is prevented. The first and second permanent magnets 32 and 37 are fitted into the first and second interfitting grooves 31 and 36, and are held by the first and second magnet holders 30 and 35 such that radial, circumferential, and axial movement is prevented.

As shown in FIG. 1, the first and second permanent magnets 32 and 37 are magnetically oriented in a reverse direction to the orientation of a magnetic field 51 that is generated by passing an electric current through the field coil 14. Extensions of the directions of magnetization 52 of the first and second permanent magnets 32 and 37 are directed at inner circumferential surfaces near the tip ends of the facing second and first claw-shaped magnetic pole portions 24 and 20. Moreover, in the case of a design in which the orientation of the magnetic field 51 that the field current that flows through the field coil 14 produces is inverted, the first and second permanent magnets 32 and 37 will also be magnetically oriented in a reverse direction.

Next, operation of an automotive alternator 1 that has been configured in this manner will be explained.

First, current is supplied from a battery (not shown) to the field coil 14 of the rotor 13 by means of the brushes 9, the slip rings 8, and the lead wire 40, generating magnetic flux. The first claw-shaped magnetic pole portions 20 of the first pole core body 17 are magnetized into North-seeking (N) poles by this magnetic flux, and the second claw-shaped magnetic pole portions 24 of the second pole core body 21 are magnetized into South-seeking (S) poles.

At the same time, rotational torque from an engine is transmitted to the shaft 16 by means of a belt (not shown) and the pulley 6, rotating the rotor 13. Thus, a rotating magnetic field is applied to the stator coil 12 of the stator 10, generating electromotive forces in the stator coil 12. These alternating-current electromotive forces are rectified into direct current by the rectifier to charge the battery or to be supplied to electric loads, etc.

Magnetic flux that has been generated when the current is passed through the field coil 14 enters tooth portions of the stator core 11 by passing through the air gap 29 from the first claw-shaped magnetic pole portions 20. The magnetic flux that has entered the stator core 11 then moves circumferentially through a core back portion from the tooth portions of the stator core 11, and enters neighboring second claw-shaped magnetic pole portions 24 by passing through the air gap 29 from the tooth portions that face those second claw-shaped magnetic pole portions 24. Next, the magnetic flux that has entered the second claw-shaped magnetic pole portions 24 passes through the second yoke portion 23, the second boss portion 22, the first boss portion 18, and the first yoke portion 19, and reaches the first claw-shaped magnetic pole portions 20.

The first and second permanent magnets 32 and 37 are magnetically oriented so as to be opposite to the orientation of the magnetic field 51 that is generated by the field coil 14. Thus, magnetic flux that originates from the first permanent magnets 32 enters the first magnet holders 30. Here, the first trough portions 25, i.e., large spaces, are present below the first magnet holders 30. Thus, the magnetic flux that has entered the first magnet holders 30 flows through the first magnet holders 30 in two circumferential directions and enters the first yoke portion 19, passes through the first boss portion 18, the second boss portion 22, the second yoke portion 23, and the second claw-shaped magnetic pole portions 24, and returns to the first permanent magnets 32 across an air gap. The magnetic flux that originates from the second permanent magnets 37 enters the first claw-shaped magnetic pole portions 20 across the air gap, passes through the first yoke portion 19, the first boss portion 18, and the second boss portion 22, and enters the second yoke portion 23. The magnetic flux that has entered the second yoke portion 23 flows radially outward through two sides of the second trough portions 26 of the second yoke portion 23, enters the second magnet holders 35 from two circumferential sides of the second magnet holders 35, and returns to the second permanent magnets 37.

Thus, the magnetic flux that originates from the first and second permanent magnets 32 and 37 is in a reverse direction from the magnetic flux that originates from the field coil 14, enabling the magnetic flux density of the magnetic bodies that constitute the first and second pole core bodies 17 and 21 to be reduced significantly. Magnetic saturation by the magnetic field that originates from the field coil 14 is relieved, increasing the magnetic flux that interacts with the stator 10, and enabling generated power to be increased.

Because the first and second permanent magnets 32 and 37 are disposed so as to face the inner circumferential surfaces near the tip ends of the second and first claw-shaped magnetic pole portions 24 and 20, the magnetic circuits of the first and second permanent magnets 32 and 37 are closed magnetic circuits inside the rotor 13. Thus, magnetic flux components that interlink with the stator core 11 among the magnetic flux that originates from the first and second permanent magnets 32 and 37 (leakage flux) are reduced. As a result, the occurrence of voltages induced by the first and second permanent magnets 32 and 37 during no-load de-energization is suppressed.

Now, in the first and second pole core bodies 17 and 21, a core body that has a shape in which portions that correspond to claw-shaped magnetic pole portions project radially outward from a yoke portion is formed by a cold forging method, for example, and then the portions that correspond to claw-shaped magnetic pole portions that extend radially outward from the yoke portion are bent approximately at right angles to form claw-shaped magnetic pole portions. In Embodiment 1, because the first and second trough portions 25 and 26 are included, the portions that correspond to claw-shaped magnetic pole portions can be bent easily approximately at right angles if the first and second trough portions 25 and 26 are formed integrally on the core body when the core body is formed by the cold forging method, enabling yield in the step of bending the portions that correspond to claw-shaped magnetic pole portions to be increased.

According to Embodiment 1, a second trough portion 26 over which a second magnet holder 35 into which a second permanent magnet 37 has been mounted is not disposed can be used as an outlet space for lead wires 40 of a field coil 14. Thus, disposal of the first and second permanent magnets 32 and 37 and thickening of the lead wires 40, in other words, thickening of the wire of the field coil 14, can be achieved, enabling increased output from the automotive alternator 1.

Because the lead wires 40 of the field coil 14 are led out through a second trough portion 26, the radial position of the lead wires 40 that are led out from the rotor 13 is lower, also reducing centrifugal forces that act on the lead wires 40. Thus, the lead wires 40 can be held stably even if the lead wires 40 are made thicker.

In Embodiment 1 above, the first and second trough portions are formed together with the core body by a cold forging method, but the first and second trough portions may also be formed by machining such as broaching or end milling, etc., after the portions that correspond to claw-shaped magnetic pole portions are bent approximately at right angles to form the claw-shaped magnetic pole portions.

First and second holding grooves may also be formed integrally on the core body by a cold forging method together with the first and second trough portions, or may also be formed together with the first and second trough portions by machining such as broaching or end milling, etc., after the portions that correspond to claw-shaped magnetic pole portions are bent approximately at right angles to form the claw-shaped magnetic pole portions.

Embodiment 2

Figure 5:
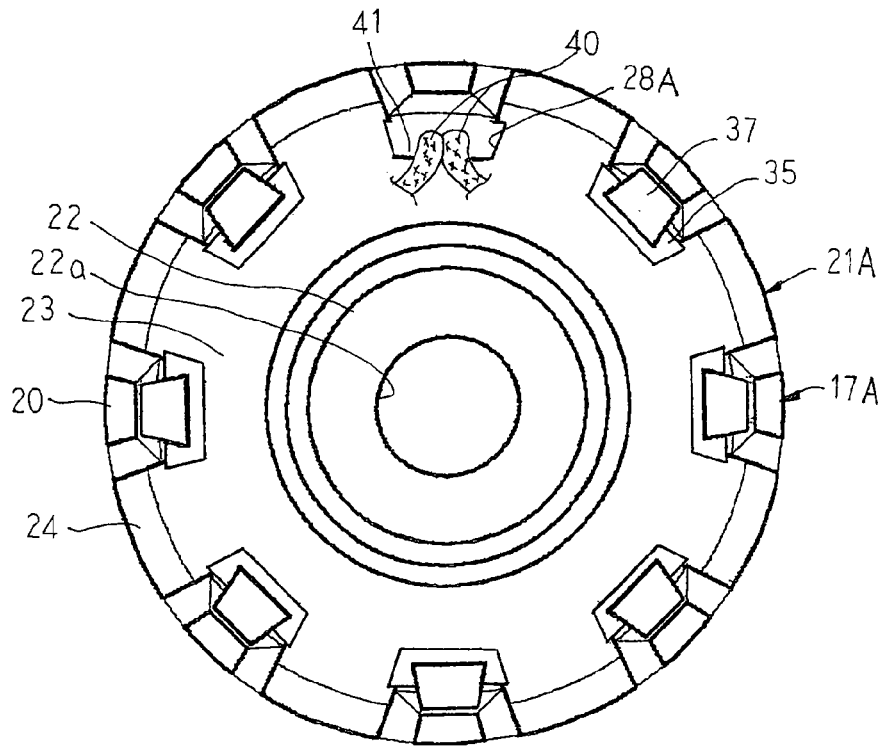
FIG. 5 is an end elevation of a rotor that can be used in an automotive alternator according to Embodiment 2 of the present invention that is viewed from a rear end.

FIG. 5 is an end elevation of a rotor that can be used in an automotive alternator according to Embodiment 2 of the present invention that is viewed from a rear end.

In FIG. 5, second trough portions are not recessed into second claw crotch portions 41 of a second pole core body 21A that are positioned between respective second claw-shaped magnetic pole portions 24 of a second yoke portion 23 that are adjacent to each other. Second holding grooves 28A are recessed into the respective second claw crotch portions 41 so as to open radially outward, and to pass through from a first end portion to a second end portion of the second yoke portion 23 so as to have groove directions oriented in an axial direction. Here, the second holding grooves 28A are formed so as to have groove shapes that have box-shaped cross sections into which second magnet holders 35 can be fitted. The second magnet holders 35 into which the second permanent magnets 37 have been mounted are fitted into the second holding grooves 28A, and disposed in seven second claw crotch portions 41, and are not disposed in one remaining second claw crotch portion 41. In addition, two lead wires 40 of the field coil 14 are led out through the second claw crotch portion 41 in which a second magnet holder 35 has not been disposed.

Here, although not shown, a first pole core body 19A is also prepared into a similar shape to the second pole core body 21A. First magnet holders into which first permanent magnets have been mounted are fitted together with and held by first holding grooves that are recessed into first claw crotch portions that are respectively positioned between circumferentially adjacent first claw-shaped magnetic pole portions.

Moreover, the rest of the configuration is configured in a similar manner to Embodiment 1 above.

In Embodiment 2, similar effects to those in Embodiment 1 above can also be achieved because a second claw crotch portion 41 in which a second magnet holder 35 into which a second permanent magnet 37 has been mounted is not disposed can be used as an outlet space for the lead wires 40 of the field coil 14.

Moreover, in Embodiment 2 above, first and second holding grooves may also be formed integrally on the core body by a cold forging method, or may also be formed by machining such as broaching or end milling, etc., after the portions that correspond to claw-shaped magnetic pole portions are bent approximately at right angles to form the claw-shaped magnetic pole portions.

In Embodiments 1 and 2 above, the two lead wires of the field coil are led out through an identical second trough portion or second claw crotch portion, but the two lead wires may also be each led out through a different second trough portion or second claw crotch portion.

In Embodiments 1 and 2 above, first and second holding grooves are recessed so as to have groove directions that are parallel to a central axis and so as to pass through from a first end to a second end of first and second yoke portions, but it is not absolutely necessary for first and second holding grooves to pass through axially, provided that they have an opening at the first end or the second end of the first and second yoke portions. In that case, the direction of insertion of the first and second magnet holders into the first and second holding grooves is limited to one axial end, but the closed ends function as stoppers that restrict axial movement of the first and second magnet holders, facilitating axial positioning of the first and second magnet holders.

The groove directions of the first and second holding grooves need only be approximately parallel to the axial direction, and may also be inclined so as to be parallel to the inner circumferential surfaces near the tip ends of the claw-shaped magnetic pole portions, for example. In that case, uniform gaps can be formed between the upper surfaces of the first and second permanent magnets and the inner circumferential surfaces near the tip ends of the second and first claw-shaped magnetic pole portions even if first and second permanent magnets that have cross-sectional shapes that are rectangular in planes that include the central axis of the rotating shaft are used.

The first and second permanent magnets are formed so as to have trapezoidal cross sections that have a predetermined thickness, but the first and second permanent magnets are not limited to a particular cross-sectional shape provided that they can be fitted together with and held by the interfitting grooves of the first and second magnet holders.

Embodiment 3

Figure 6:
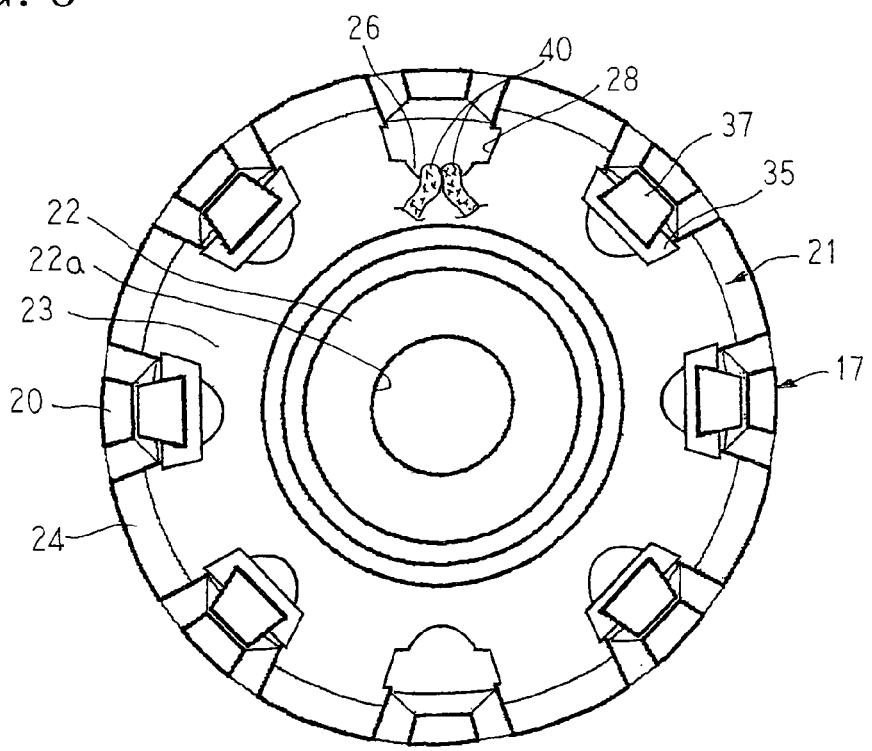
FIG. 6 is an end elevation of a rotor that can be used in an automotive alternator according to Embodiment 3 of the present invention that is viewed from a rear end.

FIG. 6 is an end elevation of a rotor that can be used in an automotive alternator according to Embodiment 3 of the present invention that is viewed from a rear end.

In FIG. 6, second magnet holders 35 to which second permanent magnets 37 have been mounted are disposed so as to span over six second trough portions 26 that do not include two second trough portions 26 that are in symmetrical positions centered on a rotating shaft 16. Lead wires 40 are led out through one of the second trough portions 26 over which a second magnet holder 35 has not been disposed.

Moreover, the rest of the configuration is configured in a similar manner to Embodiment 1 above.

In Embodiment 3, similar effects to those in Embodiment 1 above can also be achieved because a second trough portion 26 over which a second magnet holder 35 into which a second permanent magnet 37 has been mounted is not disposed can be used as an outlet space for the lead wires 40 of the field coil 14.

According to Embodiment 3, because the two second trough portions 26 over which second magnet holders 35 into which second permanent magnets 37 have been mounted are not disposed are in a symmetrical positional relationship centered on the rotating shaft 16, superior reliability can be ensured without generating gravimetric imbalances relative to centrifugal forces.

Embodiment 4

Figure 7:
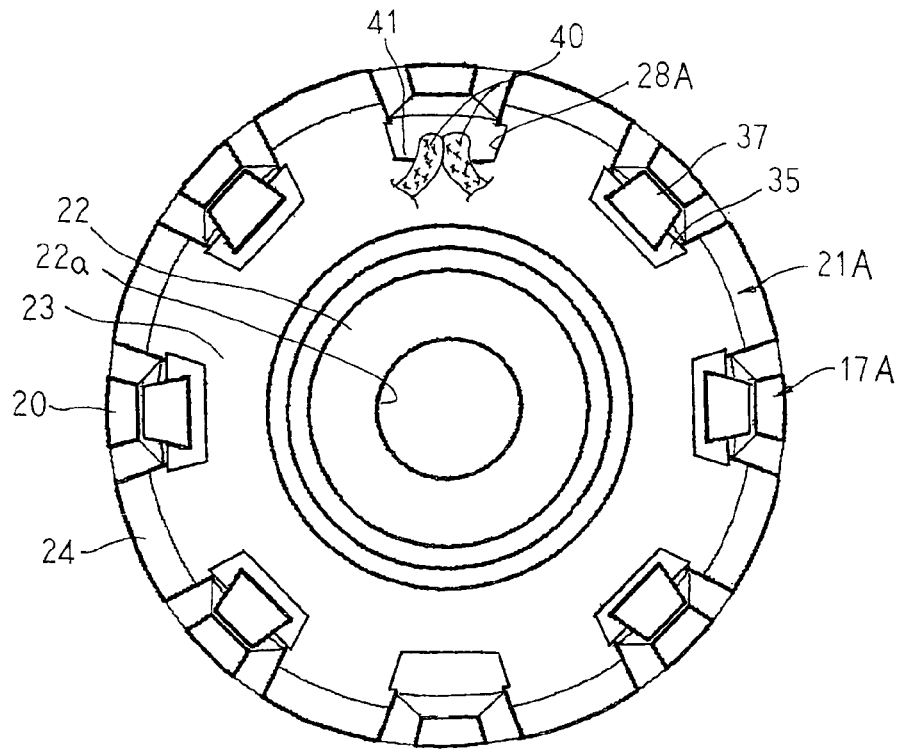
FIG. 7 is an end elevation of a rotor that can be used in an automotive alternator according to Embodiment 4 of the present invention that is viewed from a rear end.

FIG. 7 is an end elevation of a rotor that can be used in an automotive alternator according to Embodiment 4 of the present invention that is viewed from a rear end.

In FIG. 7, second magnet holders 35 to which second permanent magnets 37 have been mounted are disposed in six second claw crotch portions 41 that do not include two second claw crotch portions 41 that are in symmetrical positions centered on a rotating shaft 16. Lead wires 40 are led out through one of the second claw crotch portions 41 in which a second magnet holder 35 has not been disposed.

Moreover, the rest of the configuration is configured in a similar manner to Embodiment 2 above.

In Embodiment 4, similar effects to those in Embodiment 2 above can also be achieved because a second claw crotch portion 41 in which a second magnet holder 35 into which a second permanent magnet 37 has been mounted is not disposed can be used as an outlet space for the lead wires 40 of the field coil 14.

According to Embodiment 4, because the second claw crotch portions 41 in which second magnet holders 35 into which second permanent magnets 37 have been mounted are not disposed are in a symmetrical positional relationship centered on the rotating shaft 16, superior reliability can be ensured without generating gravimetric imbalances relative to centrifugal forces.

Moreover, in Embodiments 3 and 4 above, the two lead wires of the field coil are led out through an identical second trough portion or second claw crotch portion, but the two lead wires may also be each led out through a different second trough portion or second claw crotch portion. In that case, second magnet holders are not disposed in two second trough portions or second claw crotch portions that are in symmetrical positions that are centered on the rotating shaft from the two second trough portions or second claw crotch portions through which the lead wires are led out. Each of the two lead wires may also be led out through each of two second trough portions or second claw crotch portions in which second magnet holders are not disposed that are in symmetrical positions that are centered on the rotating shaft. Reductions in the number of second permanent magnets disposed can thereby be suppressed.

Embodiment 5

Figure 8:
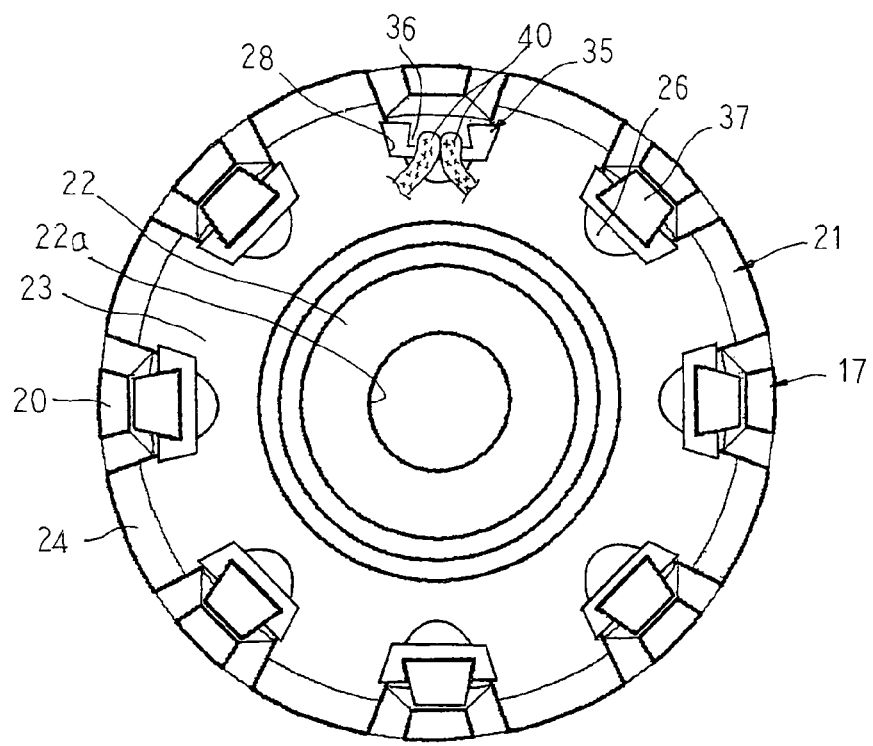
FIG. 8 is an end elevation of a rotor that can be used in an automotive alternator according to Embodiment 5 of the present invention that is viewed from a rear end.

FIG. 8 is an end elevation of a rotor that can be used in an automotive alternator according to Embodiment 5 of the present invention that is viewed from a rear end.

In FIG. 8, second magnet holders 35 into which second permanent magnets 37 have been mounted are disposed so as to span over seven second trough portions 26, and a second magnet holder 35 into which a second permanent magnet 37 has not been mounted is disposed so as to span over one second trough portion 26. Lead wires 40 are led out through the second trough portion 26 over which only a second magnet holder 35 has been disposed. Specifically, the lead wires 40 are led out so as to pass through a second interfitting groove 36 of the second magnet holder 35 that is disposed so as to span over the second trough portion 26.

Moreover, the rest of the configuration is configured in a similar manner to Embodiment 1 above.

In Embodiment 5, similar effects to those in Embodiment 1 above can also be achieved because a second interfitting groove 36 of a second magnet holder 35 that is disposed so as to span over a second trough portion 26 can be used as an outlet space for the lead wires 40 of the field coil 14.

According to Embodiment 5, because the second magnet holder 35 is disposed so as to span over the second trough portion 26 through which the lead wires 40 are led, gravimetric imbalances relative to centrifugal forces can be reduced compared to Embodiment 1 above.

Embodiment 6

Figure 9:
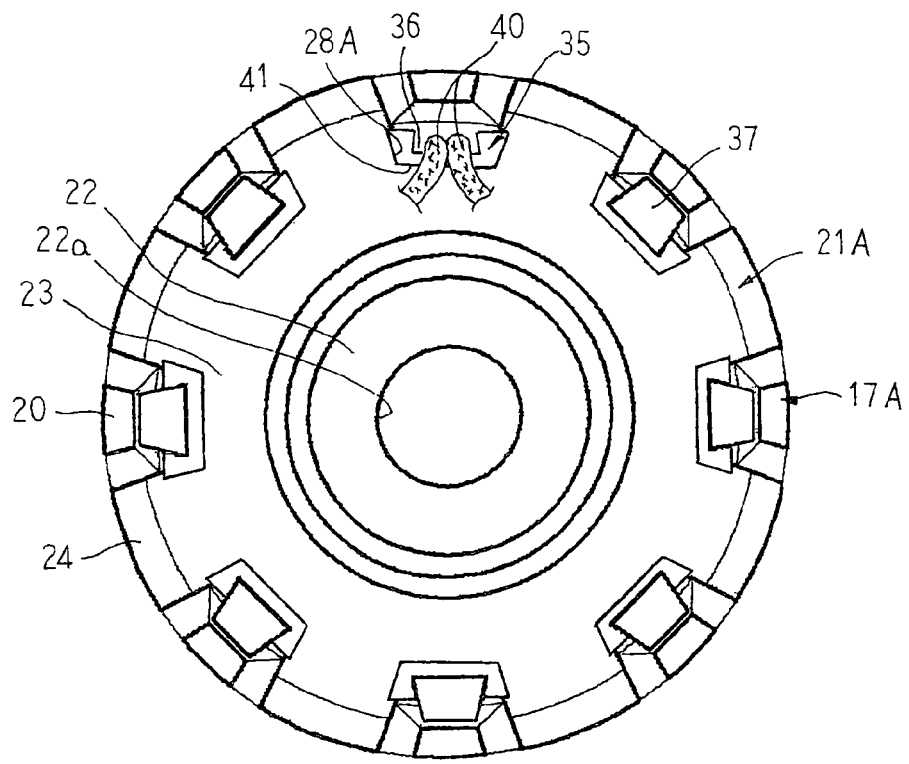
FIG. 9 is an end elevation of a rotor that can be used in an automotive alternator according to Embodiment 6 of the present invention that is viewed from a rear end.

FIG. 9 is an end elevation of a rotor that can be used in an automotive alternator according to Embodiment 6 of the present invention that is viewed from a rear end.

In FIG. 9, second magnet holders 35 into which second permanent magnets 37 have been mounted are disposed in seven second claw crotch portions 41, and a second magnet holder 35 into which a second permanent magnet 37 has not been mounted is disposed in one second claw crotch portion 41. Lead wires 40 are led out through the second claw crotch portion 41 in which only a second magnet holder 35 has been disposed so as to span. Specifically, the lead wires 40 are led out so as to pass through a second interfitting groove 36 of the second magnet holder 35 that is disposed in the second claw crotch portion 41.

Moreover, the rest of the configuration is configured in a similar manner to Embodiment 2 above.

In Embodiment 6, similar effects to those in Embodiment 2 above can also be achieved because a second interfitting groove 36 of a second magnet holder 35 that is disposed in a second claw crotch portion 41 can be used as an outlet space for the lead wires 40 of the field coil 14.

According to Embodiment 6, because the second magnet holder 35 is disposed in over the second claw crotch portion 41 through which the lead wires 40 are led, gravimetric imbalances relative to centrifugal forces can be reduced compared to Embodiment 2 above.

Moreover, in Embodiments 5 and 6 above, the two lead wires of the field coil are led out through an identical second trough portion or second claw crotch portion, but the two lead wires may also be each led out through a different second trough portion or second claw crotch portion.

Embodiment 7

Figure 10:
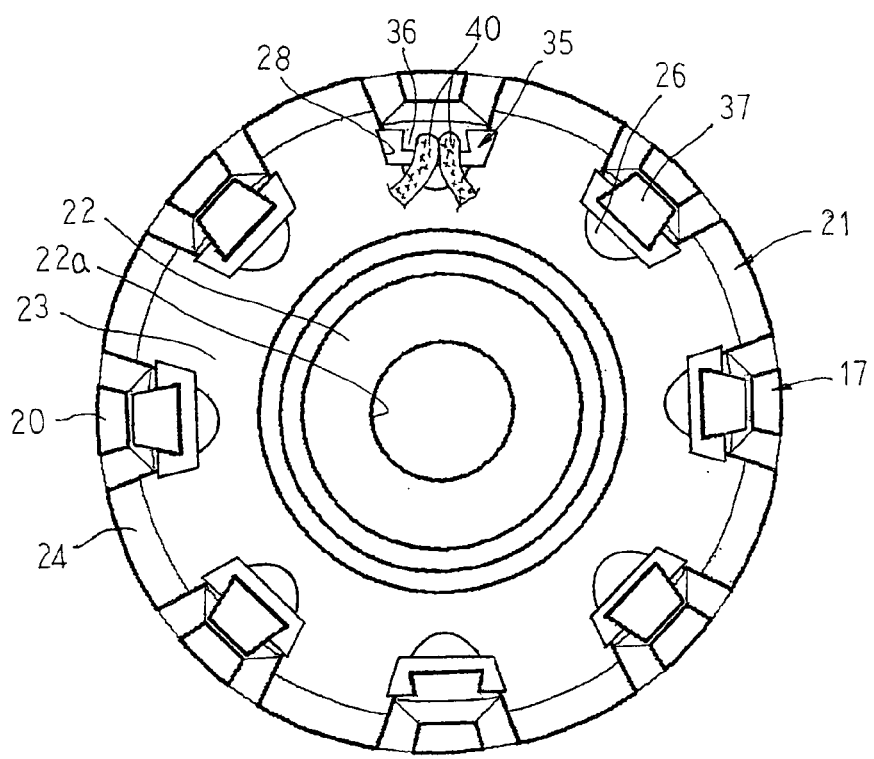
FIG. 10 is an end elevation of a rotor that can be used in an automotive alternator according to Embodiment 7 of the present invention that is viewed from a rear end.

FIG. 10 is an end elevation of a rotor that can be used in an automotive alternator according to Embodiment 7 of the present invention that is viewed from a rear end.

In FIG. 10, second magnet holders 35 to which second permanent magnets 37 have been mounted are disposed so as to span over six second trough portions 26 that do not include two second trough portions 26 that are in symmetrical positions centered on a rotating shaft 16. Second magnet holders 35 to which second permanent magnets 37 have not been mounted are disposed so as to span over two second trough portions 26 that are in symmetrical positions centered on a rotating shaft 16. In addition, lead wires 40 are led out through one of the second trough portions 26 over which only a second magnet holder 35 has been disposed. Specifically, the lead wires 40 are led out so as to pass through a second interfitting groove 36 of the second magnet holder 35 that is disposed so as to span over one of the second trough portions 26.

Moreover, the rest of the configuration is configured in a similar manner to Embodiment 5 above.

In Embodiment 7, similar effects to those in Embodiment 5 above can also be achieved because a second interfitting groove 36 of a second magnet holder 35 that is disposed so as to span over a second trough portion 26 can be used as an outlet space for the lead wires 40 of the field coil 14.

According to Embodiment 7, because the second trough portions 26 over which second magnet holders 35 into which second permanent magnets 37 have not been mounted are disposed so as to span are in a symmetrical positional relationship centered on the rotating shaft 16, superior reliability can be ensured without generating gravimetric imbalances relative to centrifugal forces.

Embodiment 8

Figure 11:
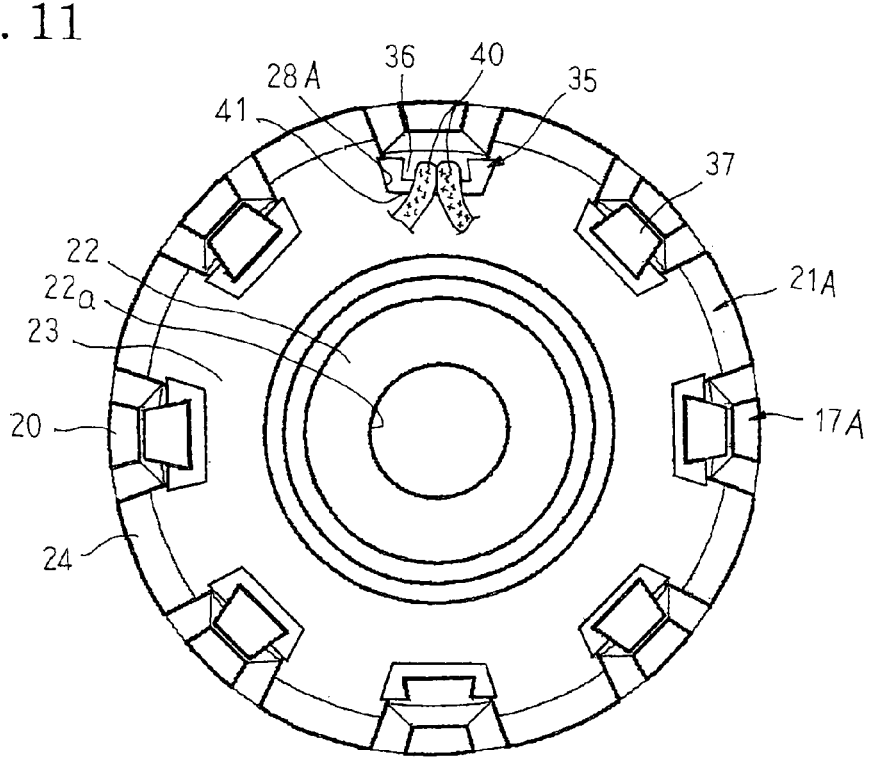
FIG. 11 is an end elevation of a rotor that can be used in an automotive alternator according to Embodiment 8 of the present invention that is viewed from a rear end.

FIG. 11 is an end elevation of a rotor that can be used in an automotive alternator according to Embodiment 8 of the present invention that is viewed from a rear end.

In FIG. 11, second magnet holders 35 to which second permanent magnets 37 have been mounted are disposed in six second claw crotch portions 41 that do not include two second claw crotch portions 41 that are in symmetrical positions centered on a rotating shaft 16. Second magnet holders 35 to which second permanent magnets 37 have not been mounted are disposed in the two second claw crotch portions 41 that are in symmetrical positions centered on a rotating shaft 16. In addition, lead wires 40 are led out through one of the second claw crotch portions 41 in which only a second magnet holder 35 has been disposed. Specifically, the lead wires 40 are led out so as to pass through a second interfitting groove 36 of the second magnet holder 35 that is disposed in one of the second claw crotch portions 41.

Moreover, the rest of the configuration is configured in a similar manner to Embodiment 6 above.

In Embodiment 8, similar effects to those in Embodiment 6 above can also be achieved because a second interfitting groove 36 of a second magnet holder 35 that is disposed in a second claw crotch portion 41 can be used as an outlet space for the lead wires 40 of the field coil 14.

According to Embodiment 8, because the second claw crotch portions 41 in which only second magnet holders 35 are disposed are in a symmetrical positional relationship centered on the rotating shaft 16, superior reliability can be ensured without generating gravimetric imbalances relative to centrifugal forces.

Moreover, in Embodiments 7 and 8 above, the two lead wires of the field coil are led out through an identical second trough portion or second claw crotch portion, but the two lead wires may also be each led out through a different second trough portion or second claw crotch portion. In that case, second magnet holders to which second permanent magnets have not been mounted are disposed in two second trough portions or second claw crotch portions that are in symmetrical positions that are centered on the rotating shaft from the two second trough portions or second claw crotch portions through which the lead wires are led out. Each of the two lead wires may also be led out through each of two second trough portions or second claw crotch portions in which only second magnet holders are disposed that are in symmetrical positions that are centered on the rotating shaft. Reductions in the number of second permanent magnets disposed can thereby be suppressed.

Embodiment 9

Figure 12:
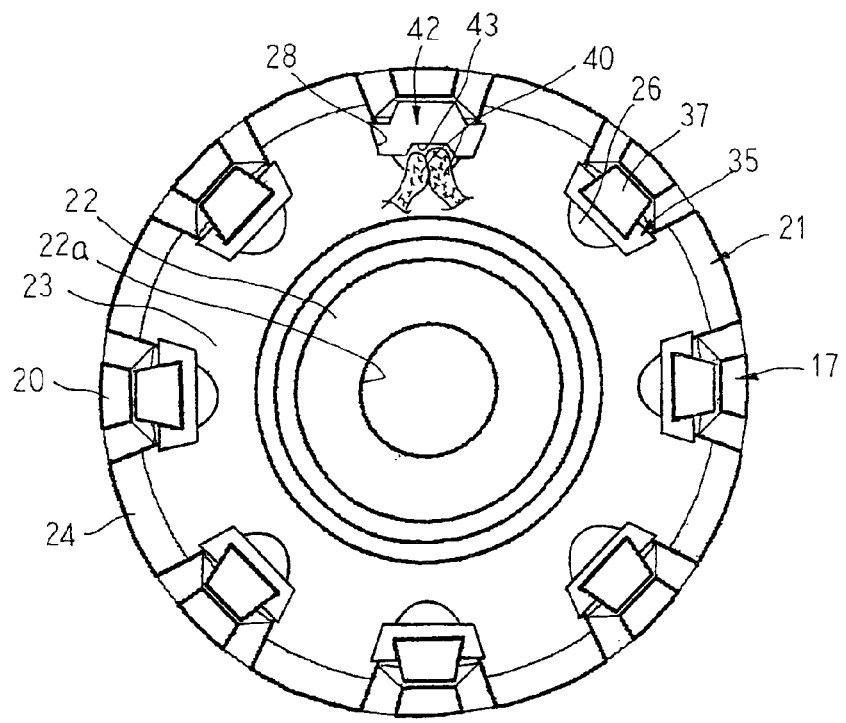
FIG. 12 is an end elevation of a rotor that can be used in an automotive alternator according to Embodiment 9 of the present invention that is viewed from a rear end.

FIG. 12 is an end elevation of a rotor that can be used in an automotive alternator according to Embodiment 9 of the present invention that is viewed from a rear end.

In FIG. 12, second magnet holders 35 into which second permanent magnets 37 have been mounted are disposed so as to span over seven second trough portions 26, and an outlet space partitioning member 42 is disposed so as to span over one remaining second trough portion 26. This outlet space partitioning member 42 has a similar weight to a second magnet holder 35 to which a second permanent magnet 37 has been mounted, and is prepared so as to have an external shape that can fit together with second holding grooves 28. In addition, an outlet notch 43 for lead wires 40 is recessed into a bottom surface of the outlet space partitioning member 42. The lead wires 40 are led out so as to pass through an outlet space that is surrounded by the outlet notch 43 of the outlet space partitioning member 42 and the second trough portion 26.

Moreover, the rest of the configuration is configured in a similar manner to Embodiment 1 above.

In Embodiment 9, similar effects to those in Embodiment 1 above can also be achieved because an outlet space that is surrounded by an outlet notch 43 of an outlet space partitioning member 42 that is disposed so as to span over a second trough portion 26 and the second trough portion 26 can be used as an outlet space for the lead wires 40 of the field coil 14.

According to Embodiment 9, because an outlet space partitioning member 42 that has a similar weight to a second magnet holder 35 to which a second permanent magnet 37 has been mounted is disposed so as to span over the second trough portion 26 through which the lead wires 40 are led, superior reliability can be ensured without generating gravimetric imbalances relative to centrifugal forces.

Because the lead wires 40 are led out so as to pass through an outlet space that is surrounded by the outlet notch 43 of the outlet space partitioning member 42 and the second trough portion 26, radial and circumferential movement of the lead wires 40 is restricted. Thus, displacement of the positions of passage of the lead wires 40 through the second trough portion 26 is suppressed even if subjected to engine vibration or vehicle vibration when moving, enabling the lead wires 40 to be held stably. Stresses that are concentrated at connection portions between the lead wires 40 and a slip ring 8 or on the portions of the lead wires 40 that are led from the field coil 14 as a result of displacement of the positions of passage of the lead wires 40 through the second trough portion 26 are thereby reduced. As a result, occurrences of wire breakage at connection portions between the lead wires 40 and a slip ring 8 or in the portions of the lead wires 40 that are led from the field coil 14 are suppressed.

Embodiment 10

Figure 13:
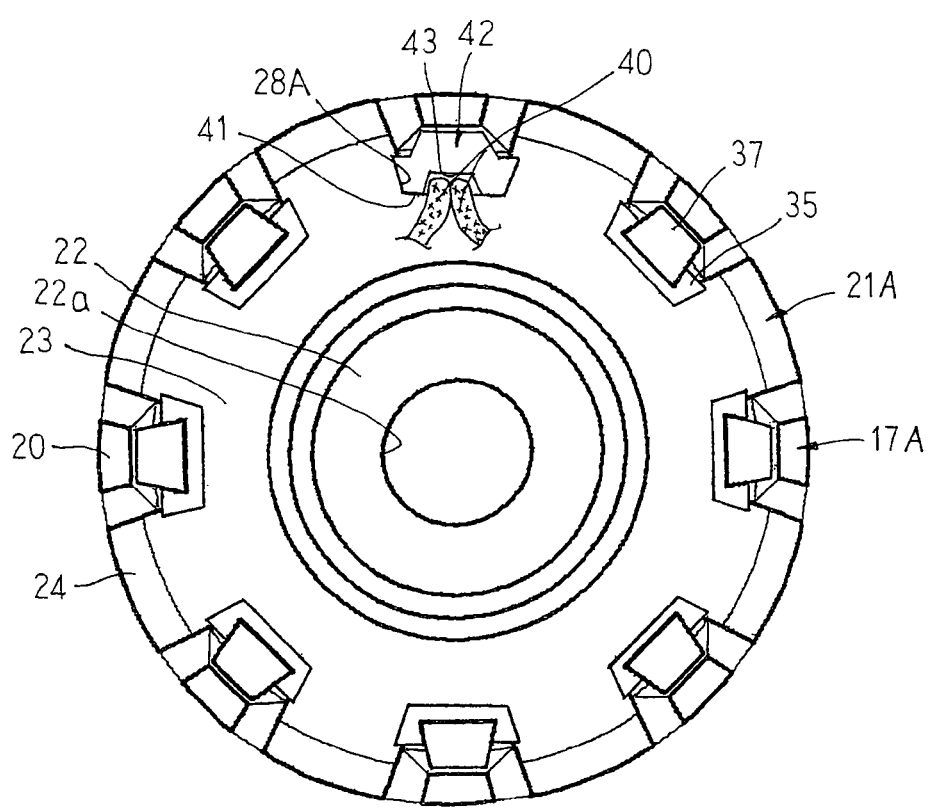
FIG. 13 is an end elevation of a rotor that can be used in an automotive alternator according to Embodiment 10 of the present invention that is viewed from a rear end.

FIG. 13 is an end elevation of a rotor that can be used in an automotive alternator according to Embodiment 10 of the present invention that is viewed from a rear end.

In FIG. 13, second magnet holders 35 into which second permanent magnets 37 have been mounted are disposed in seven second claw crotch portions 41, and an outlet space partitioning member 42 is disposed in one remaining second claw crotch portion 41. The lead wires 40 are led out so as to pass through an outlet space that is surrounded by an outlet notch 43 of the outlet space partitioning member 42 and the second claw crotch portion 41.

Moreover, the rest of the configuration is configured in a similar manner to Embodiment 2 above.

In Embodiment 10, similar effects to those in Embodiment 2 above can also be achieved because an outlet space that is surrounded by an outlet notch 43 of an outlet space partitioning member 42 that is disposed in a second claw crotch portion 41 and the second claw crotch portion 41 can be used as an outlet space for the lead wires 40 of the field coil 14.

According to Embodiment 10, because an outlet space partitioning member 42 that has a similar weight to a second magnet holder 35 to which a second permanent magnet 37 has been mounted is disposed in the second claw crotch portion 41 through which the lead wires 40 are led, superior reliability can be ensured without generating gravimetric imbalances relative to centrifugal forces.

Because the lead wires 40 are led out so as to pass through an outlet space that is surrounded by the outlet notch 43 of the outlet space partitioning member 42 and the second claw crotch portion 41, radial and circumferential movement of the lead wires 40 is restricted. Thus, displacement of the positions of passage of the lead wires 40 through the second claw crotch portion 41 is suppressed even if subjected to engine vibration or vehicle vibration when moving, enabling the lead wires 40 to be held stably. Stresses that are concentrated at connection portions between the lead wires 40 and a slip ring 8 or on the portions of the lead wires 40 that are led from the field coil 14 as a result of displacement of the positions of passage of the lead wires 40 through the second claw crotch portion 41 are thereby reduced. As a result, occurrences of wire breakage at connection portions between the lead wires 40 and a slip ring 8 or in the portions of the lead wires 40 that are led from the field coil 14 are suppressed.

Moreover, in Embodiments 9 and 10 above, the two lead wires of the field coil are led out through an identical second trough portion or second claw crotch portion, but the two lead wires may also be each led out through a different second trough portion or second claw crotch portion. In that case, an outlet space partitioning member will be disposed in each second trough portion or second claw crotch portion through which a lead wire is led. Outlet space partitioning members may be also disposed in second trough portions or second claw crotch portions that are in symmetrical positions that are centered on the rotating shaft. In that case, it is not absolutely necessary for the outlet space partitioning members to be given a similar weight to a second magnet holder 35 to which a second permanent magnet 37 has been mounted.

In Embodiments 9 and 10 above, a second magnet holder to which a second permanent magnet has been mounted is disposed in a second trough portion or second claw crotch portion that is in a symmetrical position that is centered on the rotating shaft from the second trough portion or second claw crotch portion in which the outlet space partitioning member is disposed, but it is not absolutely necessary for a second magnet holder and second permanent magnet to be disposed in the second trough portion or second claw crotch portion that is in a symmetrical position that is centered on the rotating shaft from the second trough portion or second claw crotch portion in which the outlet space partitioning member is disposed. In that case, it is desirable to reduce gravimetric imbalances by reducing the weight of the outlet space partitioning member.

Moreover, in each of the above embodiments, explanations are given for automotive alternators, but the present invention is not limited to automotive alternators, and similar effects are also exhibited if the present invention is applied to dynamoelectric machines such as automotive electric motors, automotive generator-motors, etc.

In each of the above embodiments, magnet holders are explained as being fitted into and held by holding grooves that have been recessed into yoke portions, but magnet holders may also be held directly on the yoke portions by adhesion or welding, etc., without forming holding grooves.

In each of the above embodiments, six or seven permanent magnets are disposed on the second pole core body, through which the lead wires are led out, but the permanent magnets are not limited to these numbers, and can be set appropriately to match output that is demanded of the automotive alternator. In that case, it is desirable to dispose the permanent magnets in a well-balanced manner circumferentially.

In each of the above embodiments, permanent magnets are explained as being disposed in all of the claw crotch portions of the first pole core body, through which the lead wires are not led out, but the permanent magnets are not limited to this number, and can be set appropriately to match output that is demanded of the automotive alternator. In that case, it is desirable to dispose the permanent magnets in a well-balanced manner circumferentially.

What is claimed is:

1. A dynamoelectric machine comprising:
a rotor comprising:
a pole core comprising:
a boss portion;
a pair of yoke portions that are disposed so as to extend radially outward from two axial end edge portions of said boss portion; and
a plurality of claw-shaped magnetic pole portions that are disposed so as to extend in an axial direction alternately from each of said pair of yoke portions, and that are arranged circumferentially so as to intermesh with each other, said pole core being fixed to a rotating shaft that is inserted through a central axial position of said boss portion; and
a field coil that is housed inside a space that is surrounded by said boss portion, said pair of yoke portions, and said plurality of claw-shaped magnetic pole portions;
a stator that is disposed so as to surround an outer circumference of said rotor such that a predetermined air gap is interposed;
magnet holders that are disposed in claw crotch portions that are formed on portions of said yoke portions between circumferentially adjacent claw-shaped magnetic pole portions; and
permanent magnets that are disposed so as to be held by said magnet holders so as to face inner circumferential surfaces near tip ends of said claw-shaped magnetic pole portions so as to have a predetermined clearance,
wherein one of the magnet holders does not contain a permanent magnet and a lead wire of said field coil is led out through said claw crotch portion that holds the magnet holder that does not contain the permanent magnet.

2. A dynamoelectric machine according to claim 1, wherein a magnet holder in which a permanent magnet is not held is disposed in a claw crotch portion that is in a symmetrical positional relationship centered on said rotating shaft with said claw crotch portion through which said lead wire is led out.

3. The dynamoelectric machine according to claim 1, wherein each magnet holder includes a horizontal base and two arms, the arms each attached at one end to a corresponding end of the horizontal base.

4. The dynamoelectric machine according to claim 3, wherein a width of each arm increases in a direction away from the horizontal base.

* * * * *